US006684439B2

(12) United States Patent
Jeske et al.

(10) Patent No.: US 6,684,439 B2
(45) Date of Patent: Feb. 3, 2004

(54) COAXIAL CABLE TERMINATION TOOL

(75) Inventors: Dennis J. Jeske, Waldo, WI (US); Robert W. Kruse, Rockford, IL (US); Allen W. Montgomery, Rockford, IL (US); David L. Wiesemann, Pewaukee, WI (US)

(73) Assignee: Actuant Corporation, Glendale, WI (US)

( * ) Notice: Subject to any disclaimer, the term of this patent is extended or adjusted under 35 U.S.C. 154(b) by 87 days.

(21) Appl. No.: 09/943,485

(22) Filed: Aug. 30, 2001

(65) Prior Publication Data

US 2003/0041382 A1 Mar. 6, 2003

(51) Int. Cl.$^7$ .................................................. B25F 1/00
(52) U.S. Cl. .................... 7/107; 7/127; 7/132; 81/9.44
(58) Field of Search .......................... 29/276, 739, 758; 7/107, 125, 127, 132, 133, 134, 138; 81/9.4, 9.44; 30/90.1, 90.2

(56) References Cited

U.S. PATENT DOCUMENTS

| | | | |
|---|---|---|---|
| 669,556 A | | 3/1901 | Spring |
| 1,107,684 A | | 8/1914 | Mallory |
| 1,456,928 A | | 5/1923 | Lake, Jr. |
| 2,079,505 A | | 5/1937 | Hopkins |
| 3,109,332 A | | 11/1963 | Rando |
| 3,654,647 A | * | 4/1972 | Neff ............................... 7/107 |
| 4,028,756 A | * | 6/1977 | Couto ........................... 7/107 |
| 4,607,544 A | | 8/1986 | Jewell, Jr. |
| 4,625,596 A | * | 12/1986 | Makus ......................... 81/9.44 |
| 4,799,406 A | | 1/1989 | Diaz-De-Guerenu-Aguirrebeitia |
| 4,870,876 A | | 10/1989 | Rodriquez |
| 5,295,421 A | | 3/1994 | Mansfield |
| 5,435,029 A | * | 7/1995 | Carlson et al. ................. 7/107 |
| 5,535,519 A | | 7/1996 | Brimmer |
| 5,560,107 A | * | 10/1996 | Herbert ...................... 30/90.1 |
| 5,669,132 A | | 9/1997 | Brimmer |
| 5,924,200 A | * | 7/1999 | College ....................... 30/90.1 |

OTHER PUBLICATIONS

GB Electrical, Inc., Quality Electrical Products, Dated 1992, pp. 112–115, Milwaukee, Wisconsin, USA.
GB Gardner Bender, Electrical Tools and Supplies, Dated 1997, pp. 122–125, Milwaukee, Wisconsin, USA.

* cited by examiner

Primary Examiner—James G. Smith
(74) Attorney, Agent, or Firm—Quarles & Brady LLP

(57) ABSTRACT

A hand held wire stripper includes a feature for aiding in attaching a connector to a stripped end of a coaxial cable. The wire stripper includes first and second lever members joined together by a pin, each with an elongated handle and an offset jaw having an oblique cutting edge. The jaw of the first lever member includes an opening sized to receive a coaxial cable connector and a hexagonal recessed surface about the circumference of the opening sized to receive the hexagonal nut section of the coaxial cable connector. The jaw of the second lever member includes an opening of lesser diameter that receives the stripped end of the center conductor of the coaxial cable and is located so it can be substantially concentric with the opening in the first lever member when the wire stripper is closed. The stripper recesses may be hex shaped with straight edges defining the recess. A method of stripping an insulated conductor is also disclosed.

13 Claims, 4 Drawing Sheets

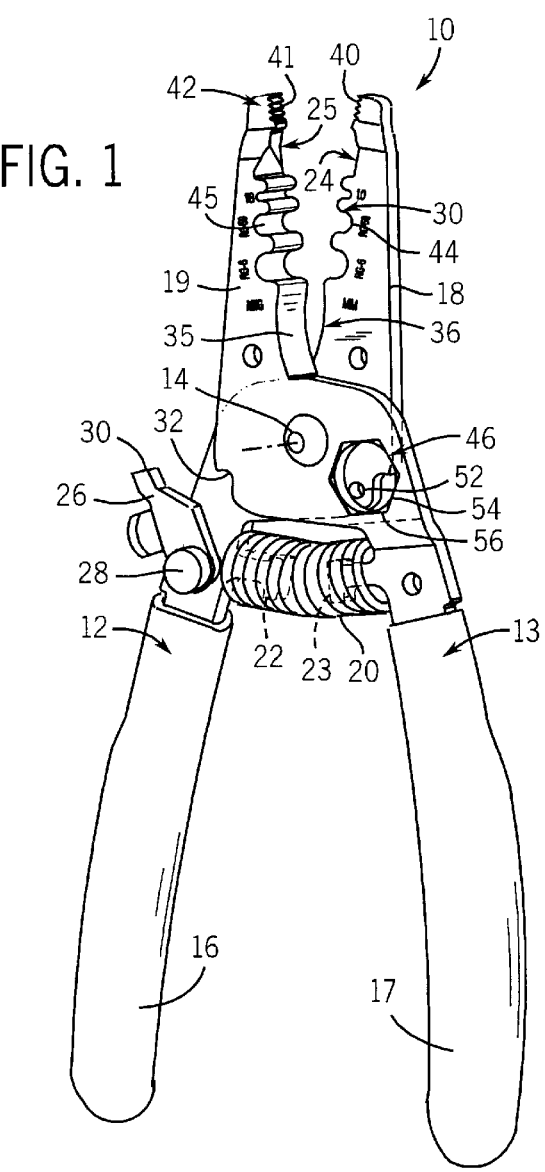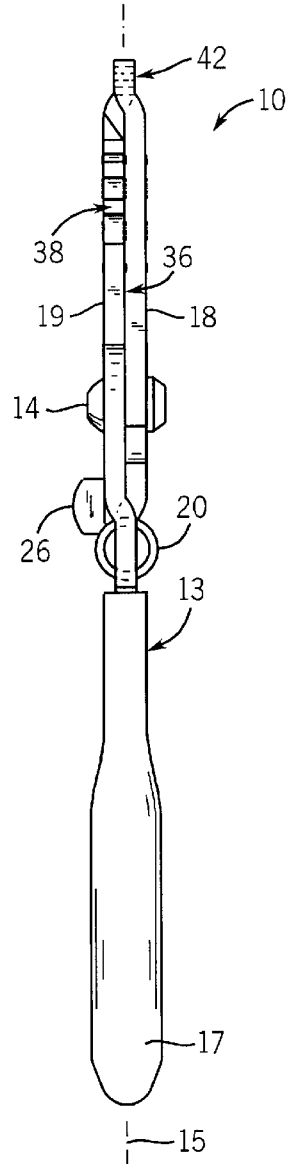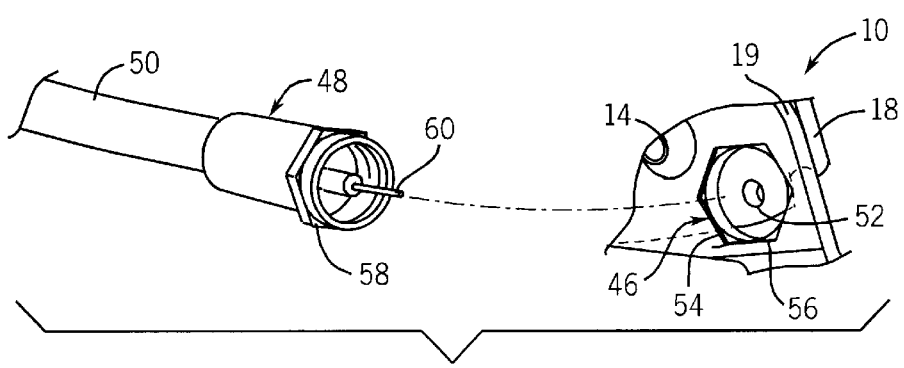

COAXIAL CABLE TERMINATION TOOL

CROSS-REFERENCE TO RELATED APPLICATIONS

Not applicable

STATEMENT OF FEDERALLY SPONSORED RESEARCH/DEVELOPMENT

Not applicable

BACKGROUND OF THE INVENTION

This invention relates to a tool for removing the insulation from a coaxial cable and installing a coaxial cable connector to the end.

Scissors-like wire strippers are well known. They typically include a pair of lever members having handles and opposing jaws. The lever members are joined together by a pivot pin so that the jaws close by squeezing the handles together. Each jaw includes an oblique cutting edge having one or more semi-circular recesses aligned with corresponding recesses of the opposing jaw. The insulation can be stripped from an insulated conductor by inserting the wire into the appropriate recess, squeezing the handles together and pulling the wire away from the stripper. The recesses allow the insulation to be stripped away without the conductor being cut. A non-notched, bladed section may be provided to cut the conductor and/or insulation.

Such wire strippers can be used to strip away the insulation of multi-conductor wire, such as coaxial cable. Typical coaxial cable includes an insulated inner conductor about which is wound an outer conductor covered by an outer layer of insulation. The outer layer and then the inner layer of insulation can be stripped away at an end of the cable to attach a terminal connector. Typically, a female connector is attached to the stripped end of the cable for mating with a threaded stud mounted to the device to which the cable is being connected, for example, a television.

To attach a connector to the stripped end of the cable, it must be pressed firmly onto the cable so that the outer conductor contacts a threaded collar of the connector, with a sleeve of the connector usually being inserted between the outer sheath conductor and the insulation of the inner conductor. The inner conductor is inserted through the end of the sleeve in the center of the connector. The stripped end of the inner connector extends beyond the end of the sleeve and beyond the end of the connector so that the inner conductor insulation isolates the connector from the inner conductor. The connector cannot be attached to the cable by pressing it against a flat surface because the inner conductor will not be seated properly and/or it may get bent or broken since it extends beyond the connector.

Using conventional wire strippers, it is possible to grip the outside of the connector between the jaws without constraining the inner conductor. However, the grip may be insufficient to hold the connector when it is pressed onto the cable with the necessary force. A tool with a stronger grip, such as a pliers, can be used to hold the connector, but this can still be awkward to handle and risks crushing the connector.

Accordingly, there exists a need in the art for an improved wire stripper for installing connectors to coaxial cable.

SUMMARY OF THE INVENTION

The present invention provides a hand-held wire stripper with a feature for aiding in attaching a connector to a stripped end of an insulated conductor, such as a coaxial cable.

In particular, the wire stripper includes first and second lever members each with an elongated handle and an offset jaw having an oblique cutting edge. The first and second lever members are joined together by a pin so that the cutting edges lie adjacent each other when in a closed position. The jaw of the first lever member includes an aperture sized to receive a coaxial cable connector. The jaw of the second lever member includes a recess of lesser diameter that is located so it can be substantially concentric with the aperture in the first lever member.

In a preferred form, the recess is substantially concentric with the aperture when the wire stripper is in the closed position. A latch pivotally attached to the second lever member has a projection that engages a notch in the first lever member so as to maintain the wire stripper in the closed position.

In another preferred form, the first lever member includes a recessed surface about the circumference of the aperture. The recessed surface has a hexagonal perimeter sized to receive a hexagonal nut of the coaxial cable connector.

In yet another form, the jaw cutting edge of the first lever member includes a first set of incrementally sized recesses opening inwardly. The jaw cutting edge of the second lever member includes a second set of incrementally sized recesses opening inwardly and aligned with the first set. The recesses can be semi-circular or multi-sided so that when the wire stripper is in the closed position the first and second set of recesses form incrementally sized circular or multi-sided (preferably hexagonal) openings. There is one recess for stripping the inner wire insulation, one for stripping the outer insulation from RG59 cable and a third for stripping the outer insulation from RG6 cable. At their tips, the jaws have opposing toothed sections like a pliers.

The invention also provides a wire stripper with multi-sided stripping recesses such that when the jaws are closed the recesses form multi-sided openings. Preferably, the recesses have three sides so that the openings are hexagonal. A method of stripping an insulated conductor using a wire stripper with multi-sided stripping recesses is also disclosed. The method includes closing the jaws about the insulated conductor so that it is disposed in an opening formed by aligned multi-sided recesses in the jaws and rotating the wire stripper with respect to the insulated conductor. Preferably, the wire stripper is rotated with respect to the insulated conductor substantially 90 degrees, such as substantially 45 degrees from the starting position in clockwise and counter clockwise directions.

Thus, the present invention provides a multi-function hand-held wire stripper. The wire stripper can be used to strip the insulation from wires, in particular, coaxial cable. The wire stripper also includes a feature against which a coaxial cable connector can be braced to force the stripped end of a coaxial cable into the connector. The feature has a pair of concentric openings, one to accommodate the connector and one to accommodate an inner conductor of the cable. Furthermore, the wire stripper includes a pliers feature at its tip for crimping the outer shield of the connector against the cable.

These and other advantages of the invention will be apparent from the detailed description and drawings.

BRIEF DESCRIPTION OF THE DRAWINGS

FIG. 1 is a front perspective view of a wire stripper of the present invention;

FIG. 4 is a side view of the wire stripper when the jaws are closed;

FIG. 5 is an enlarged perspective view of a coaxial feature of the wire stripper and a coaxial cable connector;

DETAILED DESCRIPTION OF THE PREFERRED EMBODIMENTS

Figure 2:
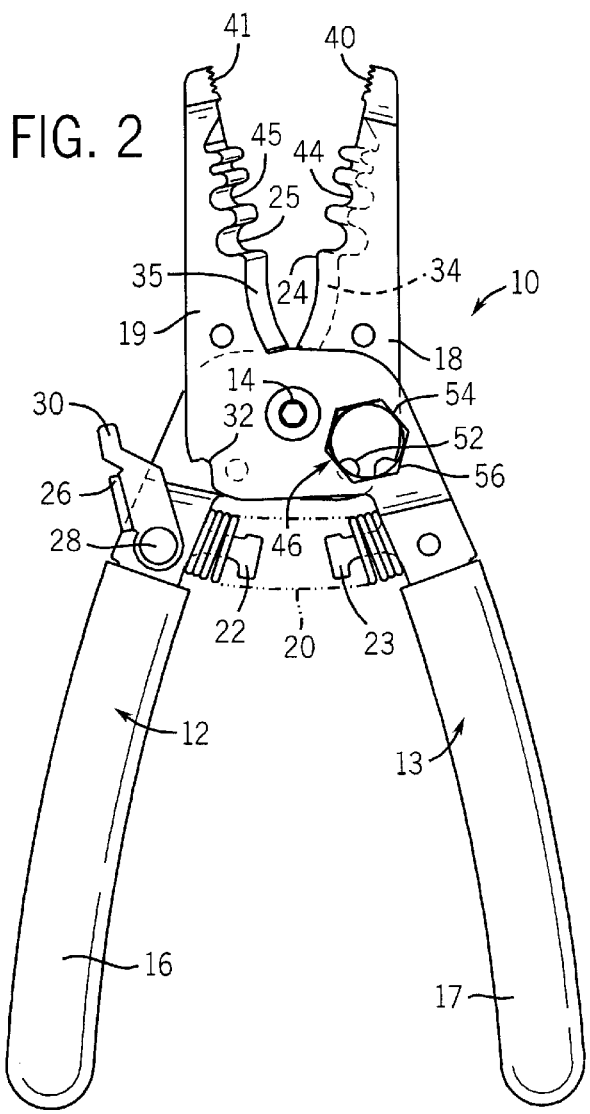
FIG. 2 is a front view of the wire stripper with the jaws fully open.
Figure 3:
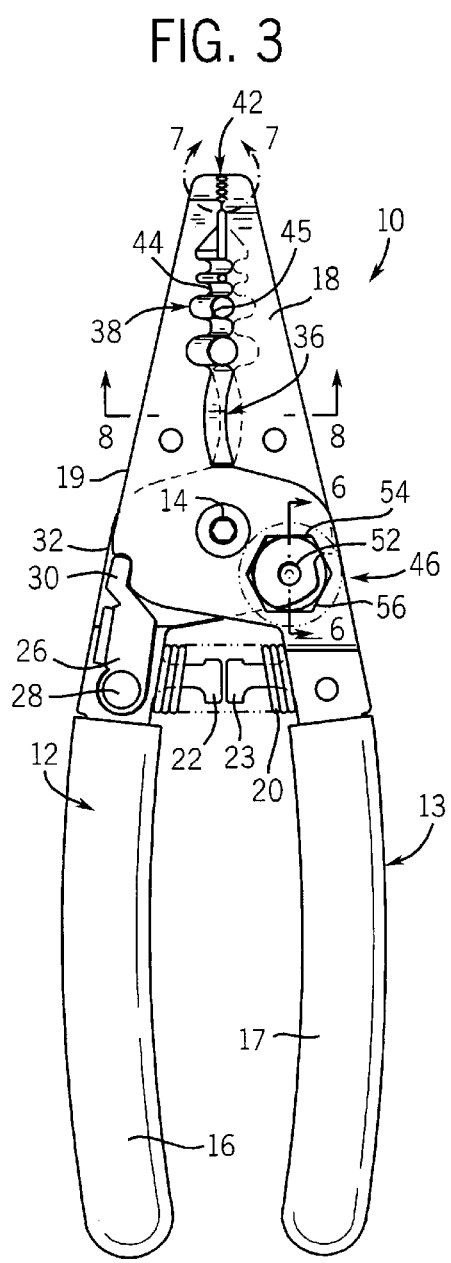
FIG. 3 is a front view of the wire stripper with the jaws locked closed.
Figure 8:
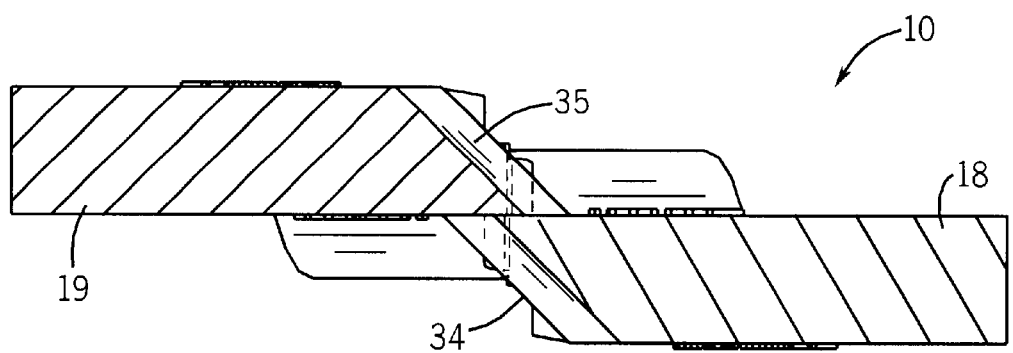
FIG. 8 is a cross-section view taken along line 8—8 of FIG. 2 showing the cutting edges of the wire stripper.

Referring to FIGS. 1–4, a hand-held wire stripper 10 includes two lever members 12 and 13 pivotally connected at a fulcrum 11 (see FIG. 1) by a suitable fastener 14. The lever members 12 and 13 have elongated handles 16 and 17 and jaws 18 and 19, respectfully, offset from the handles 16 and 17 about a centerline 15 (see FIG. 4) extending longitudinally through the fulcrum 11. A compression spring 20, secured at its ends to tabs 22 and 23 extending inwardly from the handles 16 and 17, respectively, biases the handles 16 and 17 apart so as to open the jaws 18 and 19, as shown in FIGS. 1 and 2. Pressing the handles 16 and 17 together compresses the spring 20 and pivots the jaws 18 and 19 about the fulcrum 11 until their working edges 24 and 25, respectively, are brought adjacent one another with some overlap, as shown in FIGS. 3 and 8. A latch 26, attached to handle 16 by a suitable pin connector 28, can be used to lock the jaws 18 and 19 in this position. Specifically, the latch 26 has a projecting finger 30 that can engage a notch 32 in a corner of jaw 19 to prevent the jaws 18 and 19 from pivoting about the fulcrum 11.

Figure 7:
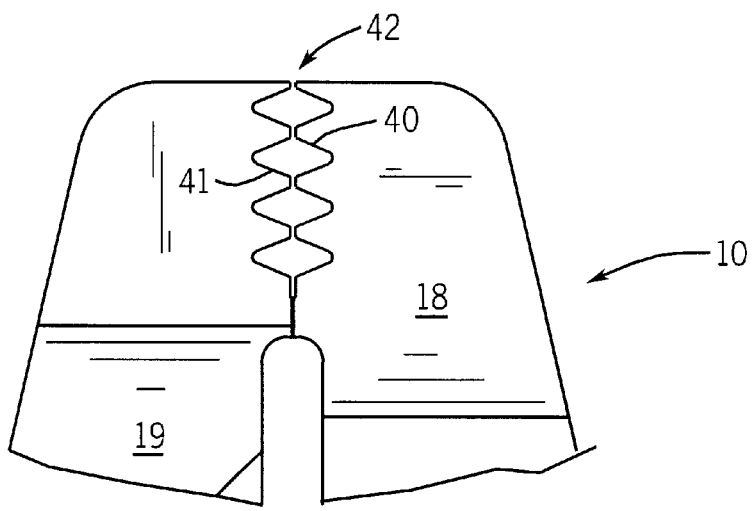
FIG. 7 is an enlarged view taken along arc 7—7 of FIG. 3 showing a pliers feature of the wire stripper.

The jaws 18 and 19 include conventional wire stripping and cutting features at the working edges 24 and 25. In particular, referring to FIG. 8, the working edges 24 and 25 have oblique surfaces 34 and 35 defining a curved if cutting section 36 nearest the fulcrum 11 and a notched stripping section 38 for stripping insulation from electrical wires and cable. Referring to FIG. 7, at the tips of each jaws 18 and 19 are a plurality of teeth 40 and 41 defining a pliers section 42 for gripping and crimping the wire or cable.

Referring to FIG. 3, the stripper section 38 has a plurality of semi-circular recesses 44 and 45 paired to form a plurality of circular openings when the jaws 18 and 19 are closed. The openings are sized to accommodate standard wire gauges of coaxial cables so that the oblique surfaces 34 and 35 surrounding the openings cut through insulation around the wire or cable but does not cut into the conductor. With the three sets of stripper recess provided, the insulation can be stripped from both RG59 and RG6 cable.

Referring now to FIGS. 2, 3, 5 and 6, the jaws 18 and 19 also define a feature 46 for attaching a connector 48 to a stripped end of a coaxial cable 50. In particular, jaw 18 has a small recess 52 or hole sized large enough to accommodate a stripped center conductor 60 of the coaxial cable 50, but sized too small to receive the center conductor if it is not stripped. This reminds the user to strip the wire before applying the connector. Jaw 19 has a hole 54 of suitable diameter to receive the circular barrel end of the connector 48. Around this hole 54 is a hexagonal recess 56 in which the hexagonal nut section 58 of the connector 48 can be inserted. When the jaws 18 and 19 are closed, the small 52 and large 54 holes are generally concentric.

Figure 6:
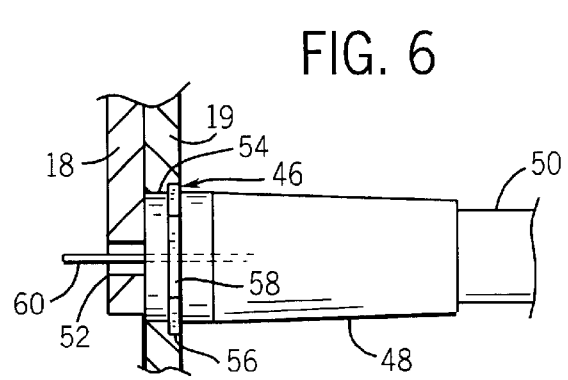
FIG. 6 is a cross-sectional view taken along line 6—6 of FIG. 3 with a coaxial cable connector in the coaxial feature.

The coaxial connector feature 46 is used for firmly pressing the connector 48 onto the stripped end of the coaxial cable 50. Specifically, with the jaws 18 and 19 locked closed, a user can insert the circular and hexagonal parts of the connecter into the large hole 54 and the hexagonal recess 56, respectively. The connector 48 is thus securely held in the coaxial connector feature 46, the engagement of the hexagonal nut and the hexagonal recess prevent the connector from rotating so the tool can be rotated to turn the connector onto the stripped end. Grasping the handles 16 and 17 with one hand and the cable 50 with the other, the user can press the cable 50 into the connector 48 firmly so that the outer electrical sheath conductor contacts the connector 48 with the connector sleeve inserted between the sheath conductor and the insulation of the center wire (or inner conductor) 60. When the two are pressed firmly together, the center wire 60 usually extends slightly beyond the end of the connector 48. This is typically desired to ensure that the center wire is fully seated in the terminal of the device to which the cable is connected and thereby ensure proper electrical connection. Also, this helps makes sure that the center wire 60 is separated from the connector 48 by the surrounding insulation (not shown). The smaller hole 52 accommodates the center wire 60, as shown in FIG. 6, so that it does not get bent or damaged.

Figures 9, 10:
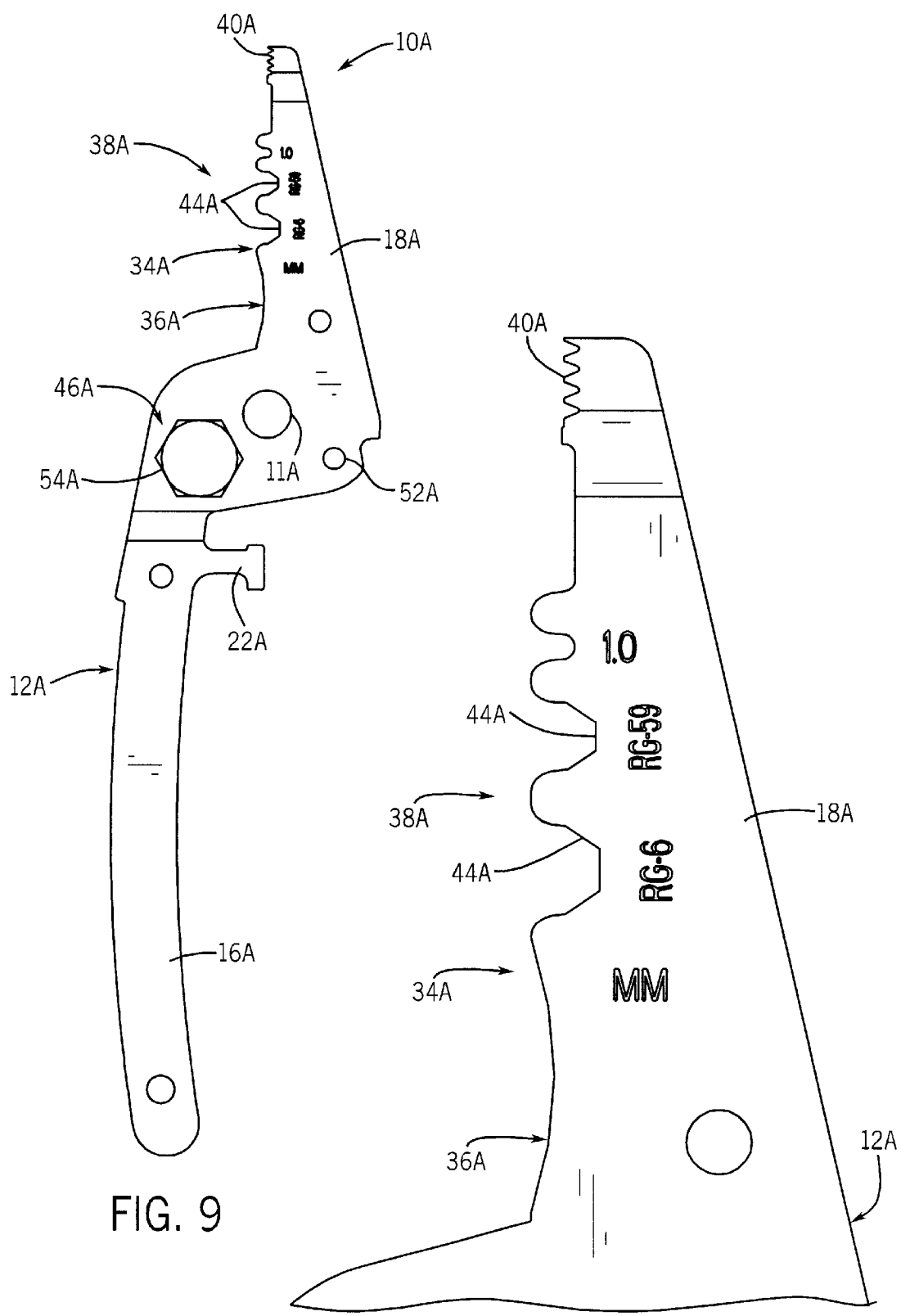
FIG. 9 is a front plan view of one half of an alternate embodiment of the wire stripper of the present invention having hexagonal stripper openings.
FIG. 10 is an enlarged view of a jaw as shown in FIG. 9 showing multiple three-sided recesses forming half of the hexagonal stripper openings.

FIGS. 9 and 10 show one lever member of an alternate embodiment of the invention. In this embodiment, elements similar to those of the above described embodiment are referred to with like reference numbers albeit with the suffix "A". Specifically, wire stripper 10A includes a lever member 12A as shown in FIG. 9. Although not shown, the wire stripper 10A includes a second, identical lever member that is connected (as a mirror image) to lever member 12A so as to pivot about a fulcrum 11A, as in the above embodiment. Since the lever members are identical, only one will be described herein. Lever member 12A has an elongated handle 16A, and a jaw 18A offset from the handle 16A. A tab 22A extends inwardly from the handle 16A for attaching a compression spring to bias the lever members apart. A latch (not shown) can be attached to the handle 16A for locking lever members closed.

Like the first embodiment, the jaw 18A includes wire stripping and cutting features. In particular, oblique surface 34A defines a curved cutting section 36A nearest the fulcrum 11A and a recessed stripping section 38A for stripping insulation from electrical wires and cable. Moreover, the jaw 18A has a plurality of teeth 40A at its tip defining a pliers section for gripping and crimping the wire or cable.

Additionally, lever member 12A also defines two features 46A for attaching coaxial cable connectors, as described above. In this embodiment, the lever members include both a small recess or hole 52A as well as a large hole 54A around which is a hexagonal recess (on the opposite side from that shown in FIG. 9). When the jaws of the lever members are closed, the small 52A and large 54A holes of one lever member align with the large and small holes, respectively, of the other lever member. Thus, one can use either side of the wire stripper 10A to join a connector to the stripped end of a coaxial cable. Moreover, this allows both lever members to be identical, thereby providing manufacturing efficiencies.

Unlike the first embodiment, the stripper section 38A has a plurality of three sided stripper recesses 44A designed so as to form a plurality of hexagonal openings when the jaws of the lever members are closed. The recesses (and thereby the hexagonal openings) are sized to accommodate standard wire gauges of coaxial cables. The angled oblique surfaces surrounding the openings of the two larger recesses 44A allow the insulation to be removed by rotating the wire stripper 10A around wire or cable. The straight edges more easily penetrate soft insulation without crushing it. To strip the wire or cable, preferably the wire stripper 10A is rotated through approximately 45 degrees in each direction. As the wire stripper 10A is rotated, the straight hexagonal sides slice into the insulation and cut away the metal braiding under the outer insulation, which can be difficult to cut otherwise. Like the first embodiment, the wire cutter 10A does not significantly cut into the conductor. This technique may be preferred to avoid crushing the insulation and nicking the conductor when stripping soft insulation, such as that used with RG59 cable. Also like the first embodiment, the recesses 44A can be used to strip insulation from both RG59 and RG6 cable.

Thus, the present invention provides a multi-function hand-held wire stripper. The wire stripper can be used to strip the insulation from wires, in particular, coaxial cable. The wire stripper also includes a feature against which a female connector can be braced to force the stripped end of a coaxial cable into the connector. The feature has a pair of concentric openings, one to accommodate the connector and one to accommodate an inner conductor of the cable. Furthermore, the wire stripper includes a pliers feature at its tip that can be used to crimp the outer shield of the connector against the cable.

Preferred embodiments of the invention have been described in considerable detail. Many modifications and variations to the preferred embodiments will be apparent to those skilled in the art, which will be within the spirit and scope of the invention. Therefore, the invention should not be limited to the described embodiment. To ascertain the full scope of the invention, the following claims should be referenced.

What is claimed is:

1. A hand held wire stripper having a first lever member and a second lever member each with an elongated handle and an offset jaw having an oblique cutting edge, the first and second lever members being pivotally joined so that the cutting edges lie adjacent each other when in a closed position, wherein the jaw of the first lever member includes a hole sized to receive a barrel section of a coaxial cable connector and wherein the jaw of the second lever member includes a recess of lesser diameter than the hole that is sized to receive therethough the center wire of a coaxial cable and is located so that the recess can be substantially concentric with the hole in at least one position of the lever members relative to one another.

2. The wire stripper of claim 1, wherein the recess is substantially concentric with the hole when the wire stripper is in the closed position.

3. The wire stripper of claim 1, wherein the recess is a through bore.

4. The wire stripper of claim 1, wherein the first lever member includes a recessed surface about the circumference of the hole.

5. The wire stripper of claim 4, wherein the recessed surface has a hexagonal perimeter sized to receive a hexagonal nut section of the coaxial cable connector.

6. The wire stripper of claim 1, further including a latch pivotally attached to the second lever member, the latch having a projection that engages a notch in the first lever member so as to maintain the wire stripper in the closed position.

7. The wire stripper of claim 1, further including a spring biasing apart the handles of the first and second lever members.

8. The wire stripper of claim 1, wherein the jaw cutting edge of the first lever member includes a first set of incrementally sized recesses opening inwardly and the jaw cutting edge of the second lever member includes a second set of incrementally sized recesses opening inwardly and aligned with the first set so that when the wire stripper is in the closed position the first and second set of recesses form incrementally sized openings for stripping insulation from the coaxial cable.

9. The wire stripper of claim 8, wherein each of the first and second set of recesses are semi-circular.

10. The wire stripper of claim 8, wherein each of the first and second set of recesses are multi-sided.

11. The wire stripper of claim 8, wherein a tip of each jaw includes an inwardly extending toothed section.

12. The wire stripper of claim 1, wherein the hole in the first lever member is too small to receive the center conductor if the center conductor is not stripped.

13. A hand held wire stripper having a first lever member and a second lever member each with an elongated handle and a jaw having an oblique cutting edge, the first and second lever members being pivotally joined so that the cutting edges lie adjacent each other when in a closed position, wherein the cutting edge of the first lever member includes a first multi-sided recess opening inward and the jaw cutting edge of the second lever member includes a second multi-sided recess opening inwardly and aligned with the first recess so that when the wire stripper is in the closed position the first and second recesses form a multi-sided opening for striping insulation from an insulated conductor, wherein the jaw of the first lever member includes a hole sized to receive a barrel section of a coaxial cable connector and wherein the jaw of the second lever member includes a recess of lesser diameter that the hole that is sized to receive through the center wire of a coaxial cable and is located so that the recess can be substantially concentric with the hole in at least one position of the lever members relative to one another.

* * * * *

UNITED STATES PATENT AND TRADEMARK OFFICE
CERTIFICATE OF CORRECTION

PATENT NO.    : 6,684,439 B2
DATED         : February 3, 2004
INVENTOR(S)   : D. Jeske, R. Kruse, A. Montgomery and D. Wiesemann It is certified that error appears in the above-identified patent and that said Letters Patent is hereby corrected as shown below:

Column 3,
Line 47, replace the words "curved if cutting" with -- curved cutting --
Line 43, replace the word "inward" with -- inwardly --.
Line 48, replace the word "striping" with -- stripping --.
Line 52, replace the word "that" with -- than --.
Line 53, replace the word "through" with -- therethrough --.

Signed and Sealed this

Twentieth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,684,439 B2
DATED : February 3, 2004
INVENTOR(S) : D. Jeske, R. Kruse, A. Montgomery and D. Wiesemann It is certified that error appears in the above-identified patent and that said Letters Patent is hereby corrected as shown below:

Column 3,
Line 47, replace the words "curved if cutting" with -- curved cutting --

Column 6,
Line 43, replace the word "inward" with -- inwardly --.
Line 48, replace the word "striping" with -- stripping --.
Line 52, replace the word "that" with -- than --.
Line 53, replace the word "through" with -- therethrough --.

This certificate supersedes Certificate of Correction issued July 20, 2004.

Signed and Sealed this

Twenty-ninth Day of March, 2005

JON W. DUDAS
*Director of the United States Patent and Trademark Office*